Oct. 12, 1954 J. C. RAMSEY 2,691,527
MILLED ARROWHEAD BLADE
Filed May 21, 1951
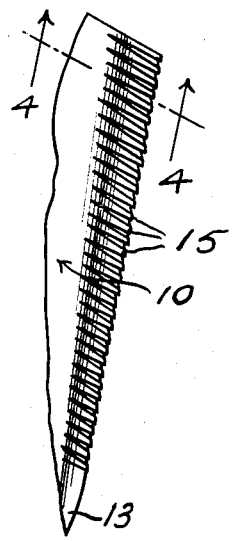
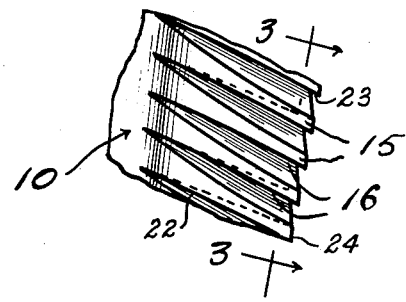
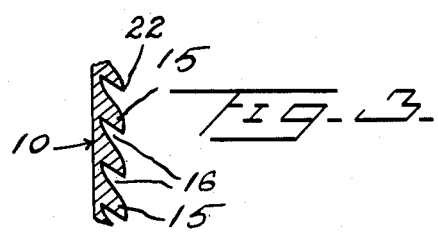
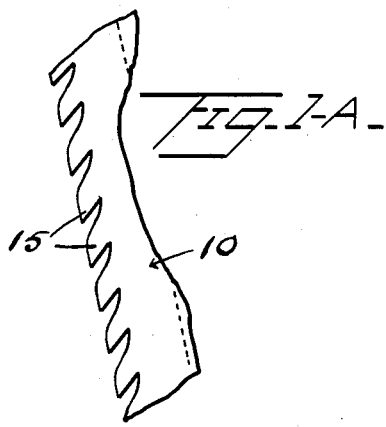
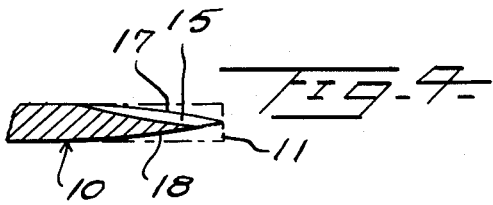
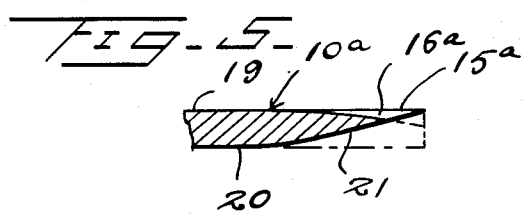
INVENTOR
James C. Ramsey
BY Kimmel & Crowell
ATTORNEYS Patented Oct. 12, 1954

2,691,527

UNITED STATES PATENT OFFICE 2,691,527

MILLED ARROWHEAD BLADE

James C. Ramsey, Lincoln, N. Mex.

Application May 21, 1951, Serial No. 227,430

1 Claim. (Cl. 273—106.5)

This invention relates to archery and arrowheads and more particularly to an improved cutting edge for arrowhead blades employed in hunting large and dangerous game animals.

In hunting big game with the bow and arrow it is very necessary that the arrowhead used be such that it will readily cut through tough hide, flesh and sinews, and sever with certainty each vein and artery it contacts in its passage into and through the animal's body.

This severing of veins and arteries by the passing arrowhead is a most important factor in hunting with the bow. The more veins and arteries that are cut the greater will be the internal as well as external hemorrhage induced, which in turn will more quickly cause the death of the animal shot, and the greater spillage of blood will make trailing down and securing the wounded game much easier, all of which is a decided benefit in hunting with the bow, and in wild-life conservation, as there will be no wounded animals such as deer to escape the hunter and die without being found to benefit anyone.

Veins and arteries are the toughest tissues of an animal's body, and even a very sharp arrowhead will often merely push one or more aside in its passage, without cutting it enough to cause bleeding. Therefore, it is the object of this invention to provide a superior cutting edge for big game hunting arrowheads, which, due to its specific shape and construction and design, will with certainty catch or hook and cut any vein or artery it touches in slitting through game.

Another object of this invention is to provide an improved cutting edge which is adaptable to use as the cutting edge on any type of bladed arrowhead.

Due to the improved design of my arrowhead blade, the cutting teeth can all be milled in at one quick, easy operation in a milling machine, and later be readily brought to a keen cutting condition by the regular sharpening of the arrowhead, and thereafter as needed, due to the fine, even manner in which they are lined along the edge of the blade, the teeth can be quickly and easily restored to a perfect cutting condition collectively by a few strokes of a small file or whetstone along the whole edge at once.

With the above and other objects in view, my invention consists in the arrangement, combination and details of construction disclosed in the drawings and specification, and then more particularly pointed out in the appended claim.

In the drawings:

Figure 1 is a detailed side elevation of a fragment of an arrowhead blade constructed according to an embodiment of this invention.

Figure 1-A is a view similar to Fig. 1 showing the opposite side of the blade.

Figure 2 is a fragmentary side elevation on an enlarged scale of the blade.

Figure 3 is a fragmentary sectional view taken on the line 3—3 of Figure 2.

Figure 4 is a fragmentary sectional view taken on the line 4—4 of Figure 1.

Figure 5 is a fragmentary transverse sectional view of a modified form of this invention.

Referring to the drawing and, first, to Figures 1 to 4, inclusive, the numeral 10 designates generally one blade of an arrowhead. It will be understood that with arrowheads used for big game, there are from one to six blades, and each of such blades will be formed as hereinafter described. The blade 10 is formed out of metal, and in order to provide a means whereby the blade 10 upon piercing the body of an animal will be more sure to cut any veins, arteries or muscles, the outer edge of the blade 10 is provided with a plurality of cutting teeth 15.

The cutting teeth 15 are formed by milling substantially V-shaped grooves 16 in the blade 10 from one face thereof, the walls of the grooves 16 being inclined forwardly and obliquely in the direction of the point 13, and the teeth 15 are thereby inclined forwardly and undercut so that the teeth 15 will cut any hide, flesh, veins, arteries, or the like as the blade moves inwardly into the body of the animal.

As shown in Figure 4 the blade 10 is initially formed form a flat plate, and the outer edge 11 is then tapered outwardly by grinding or otherwise removing the metal on the outer surfaces of the teeth 15 as indicated at 17. On the opposite side of the blade 10 the metal is removed by grinding or the like as indicated at 18 so that the cutting edges of the blade 10 will extend for at least the substantial portion of the length of the blade. The V-shaped grooves 16 which are milled in the blade 10 form two cutting edges for each tooth. One cutting edge 24 is formed on the outer end of each tooth, whereas a longitudinal cutting edge 22 is formed on the forward lengthwise edge of each tooth 15. In the event any tissues are snagged at point 23 where a preceding tooth tapers inwardly and a succeeding tooth projects forwardly, the tissues will be cut by the cutting edge 22.

Referring now to Figure 5 there is disclosed a modified form of this invention embodying a blade 10a which is formed with inclined grooves or channels 16a which produce the inclined teeth 15a. In the present instance the outer surfaces of the teeth 15a are flush with the outer surface 19 of the blade 10a and the opposite surface 20 of the blade 10a is ground or otherwise tapered outwardly as indicated at 21.

With an arrowhead blade constructed according to this invention the blade 10 upon striking the animal will cut through the hide and any hair or fur carried by the animal. The teeth 15 which project from one face and edge of the blade 10 are forwardly inclined so that if the blade 10 should strike any veins, arteries, muscles, or the like, these members will be servered so that the animal will bleed profusely both internally and externally. This bleeding of the animal will assure the quick killing of the animal and will also assure the easy trailing of the animal in the event the animal does not immediately die as the profuse bleeding will provide a trail which can be readily followed.

What is claimed is:

An arrowhead blade comprising a flat body having a bevel along at least one edge thereof forming an outer cutting edge, said body having a plurality of V-shaped grooves having the walls thereof oblique to the surface of the bevel, said grooves forming undercut cutting teeth inclined forwardly and having a keen edge lengthwise of each tooth.

References Cited in the file of this patent

UNITED STATES PATENTS

| Number | Name | Date |
|---|---|---|
| 90,593 | Simonds | May 25, 1869 |
| 420,628 | Miller | Feb. 4, 1890 |
| 1,895,055 | Steinour et al. | Jan. 24, 1933 |
| 2,005,424 | Kindle et al. | June 18, 1935 |
| 2,274,188 | Campbell | Feb. 24, 1942 |

FOREIGN PATENTS

| Number | Country | Date |
|---|---|---|
| 338,803 | Great Britain | Nov. 27, 1930 |